（12）United States Patent
Lou

(10) Patent No.: US 7,545,522 B1
(45) Date of Patent: Jun. 9, 2009

(54) AUTOMATIC PRINTING INFORMATION DIALOGUE BOX DISPLAY

(75) Inventor: Roy Lou, San Jose, CA (US)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 09/576,037

(22) Filed: May 23, 2000

(51) Int. Cl.
*H04N 1/40* (2006.01)
(52) U.S. Cl. ..................................... 358/1.14; 358/1.15
(58) Field of Classification Search ................. 358/1.9, 358/1.14, 1.13–1.18, 2.1
See application file for complete search history.

(56) References Cited

U.S. PATENT DOCUMENTS

| | | | | |
|---|---|---|---|---|
| 3,990,362 | A * | 11/1976 | Check et al. ............. | 101/93.37 |
| 4,847,775 | A * | 7/1989 | Roch et al. .................. | 700/125 |
| 5,079,722 | A * | 1/1992 | Ogawa ....................... | 358/1.12 |
| 5,566,278 | A * | 10/1996 | Patel et al. ................. | 358/1.15 |
| 5,650,858 | A * | 7/1997 | Lund .......................... | 358/3.15 |
| 5,828,461 | A * | 10/1998 | Kubo et al. ................. | 358/296 |
| 5,963,216 | A * | 10/1999 | Chiarabini et al. .......... | 345/660 |
| 6,075,617 | A * | 6/2000 | Fischer et al. .............. | 358/1.16 |
| 6,222,638 | B1 * | 4/2001 | Otala ......................... | 358/1.18 |
| 6,226,096 | B1 * | 5/2001 | Ouchi ........................ | 358/1.14 |
| 6,268,924 | B1 * | 7/2001 | Koppolu et al. ............ | 358/1.13 |
| 6,362,892 | B1 * | 3/2002 | Lee et al. .................... | 358/1.13 |
| 6,396,594 | B1 * | 5/2002 | French et al. ............... | 358/1.18 |
| 6,615,297 | B1 * | 9/2003 | Beard et al. .................. | 710/62 |
| 6,628,413 | B1 * | 9/2003 | Lee ............................ | 358/1.15 |
| 6,707,568 | B1 * | 3/2004 | Yu ............................. | 358/1.15 |

OTHER PUBLICATIONS

Dave & Weisbart & Peggy Morell, "SuperPrint", ©1990, Zenographics, pp. 2-1 to 3-9.*

* cited by examiner

*Primary Examiner*—Thomas D Lee
*Assistant Examiner*—Stephen M Brinich
(74) *Attorney, Agent, or Firm*—Oblon, Spivak, McClelland, Maier & Neustadt, P.C.

(57) ABSTRACT

A print control system, method, and computer-program product with a print dialogue box and a printing information dialogue box. In response to a print request, the print dialogue box displays current print settings, enables modification to the print settings, and confirms the print job. Upon a confirmation of the print job, the printing information dialogue box displays automatically a synopsis of the print settings for the impending print job. The automatically displayed printing information dialogue box allows the user to confirm that the print settings are indeed the print settings desired for the particular print job prior to issuance of the print job to the printer. The printing information dialogue box permits cancellation, modification, or continuation of the print job. Once the print job has been completed, a print job dialogue box indicates that the print job is complete. The printing process thus involves entering a print request for a print job, displaying the print dialogue box in response to the print request, displaying, upon receipt of the print job confirmation and prior to issuance of the print job, the printing information dialogue box, and directing the print job by cancellation of the print job, modification of the print job, or submission of the print job to the printer. By displaying the current print settings to the user, the user can confirm that the settings are correct and issue the print job, can interrupt the print job to change the print settings, or cancel the print job. The printing process can be included on a computer program product which stores the necessary data to implement the printing process on a general purpose computer or a network of general purpose computers.

16 Claims, 7 Drawing Sheets

Print Information

General
- Printer: RICOH Aficio 850 PCL 5e
- Comment: None
- Separator Page: None

Detail
- Print port: \FortsELLINI_1_Q
- Print driver: RICOH Aficio 850 CPL 5e
- Timeout Settings:
- Not Selected: 15 seconds
- Transmission Retry: 45 seconds

Color Management
- Automatic / Manual
- Color Profiles: None

Paper
- Selection: Same paper for All pages
- Document Size: Letter (8.5" x 11")
- Fit to Print Size: No
- Print Size: A4 [210 x 297 mm]
- All Pages:
- Type: Plain
- Tray: Auto Tray Select
- Destination:
- Tray: Printer Default

Accessories
- Options:
- Large Capacity Tray
- Finisher 3000B
- Punch Unit: None

Statistics
- File Name: None
- Password: None
- User Code: None

*FIG. 3A*

AUTOMATIC PRINTING INFORMATION DIALOGUE BOX DISPLAY

BACKGROUND OF THE INVENTION

1. Field of the Invention

This invention relates to an automatically displayed print information dialogue box, a method, a system, and a computer program product which shows the current print settings after a print job is initialized and allows correction of the print settings, cancellation of the print job, or printer selection prior to issuing the print job.

2. Discussion of the Background

When a document is printed, the print settings used are defaulted from the prior print job or from the default settings stored in memory. A typical print dialogue box, such as the one shown in FIG. 2, only displays a limited number of printer settings. Typically, these print settings are the most global features such as printer, page range, print document, number of copies, etc. A significant number of print settings are not revealed to the user, unless the user requests the print settings to be displayed. To determine the print settings, the user must invoke a series of menu-selected requests, opening separate dialogue boxes with each dialogue box individually revealing property-specific features. For example, port connections are displayed on one page with spool settings, paper selection and orientation, and print quality displayed separately on other pages. The user must scroll through several pages of dialogue boxes in order to review the entirety of the print settings and, therefore, can not on one page review the majority of print settings.

Faced with this encumbering search of print properties predicated on menu-selected requests, the user frequently assumes that the print settings are correct and issues a print job without reviewing the print properties. Consequently, the user frequently issues print jobs with wrong print settings. Only after the print job has been finished does the user discover the error.

The inventor has determined that a device is needed to prevent unwarranted printing with improper print settings. A device is needed in which the print settings are readily displayed to the user so as to not encumber the user with a review of multiple pages of specific print settings.

SUMMARY OF THE INVENTION

Accordingly, one object of the invention is to provide a novel automatically displayed print information dialogue box, a method and system for automatically displaying the print information dialogue box, and a computer program product which shows a synopsis of the print settings after a print job is initialized but prior to printing, thus permitting cancellation of the print job, correction of the print settings, or issuance of the print job to a printer.

Accordingly, this and other objects are provided for in a novel print control system, method, and computer-program product which includes a print dialogue box and a printing information dialogue box. In response to a print request, the print dialogue box displays current print settings, enables modification to the print settings, and confirms the print job. Upon a confirmation of the print job, the printing information dialogue box displays automatically a synopsis of the print settings for the impending print job. The automatically displayed printing information dialogue box allows the user to confirm that the print settings are indeed the print settings desired for the particular print job prior to issuance of the print job to the printer. The printing information dialogue box permits cancellation, modification, or continuation of the print job. Once the print job has been completed, a print job dialogue box indicates that the print job is complete. The printing process thus involves entering a print request for a print job, displaying the print dialogue box in response to the print request, displaying, upon receipt of the print job confirmation and prior to issuance of the print job, the printing information dialogue box, and directing the print job by cancellation of the print job, modification of the print job, or submission of the print job to the printer. By displaying the current print settings to the user, the user can confirm that the settings are correct and issue the print job, can interrupt the print job to change the print settings, or cancel the print job.

The printing process can be included on a computer program product which stores data to implement the printing process on a computer such as a general purpose computer or a network of general purpose computers.

Thus, the present invention provides the user an opportunity to continue or cancel the print job before it is erroneously issued to print.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
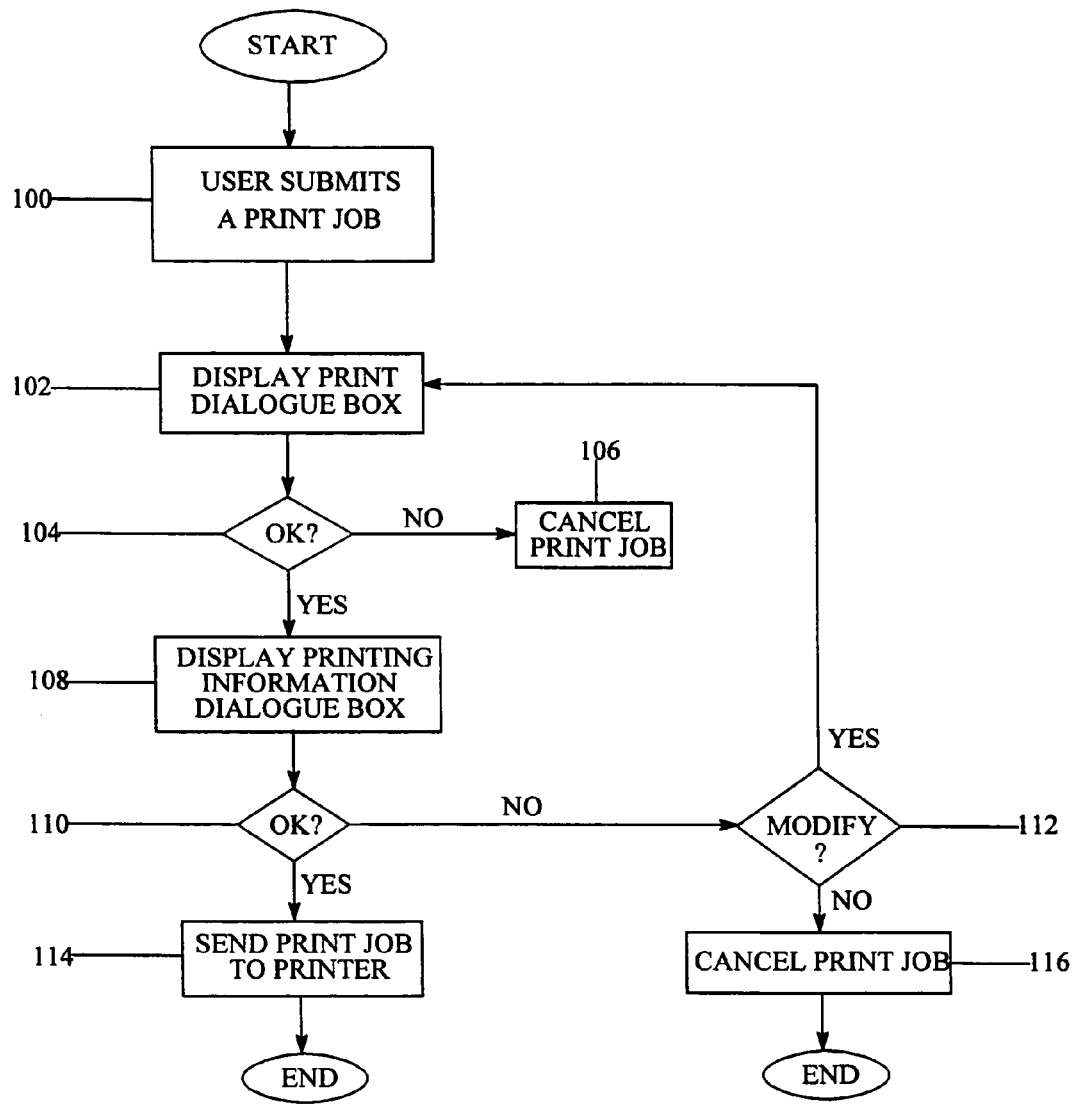
FIG. 1 is a flowchart showing the computer printing method of the present invention.

Referring now to the drawings, wherein like reference numerals designate identical or corresponding parts throughout the several views, and more particularly to FIG. 1 thereof, there is a flowchart showing the computer printing method of the present invention.

Figure 2:
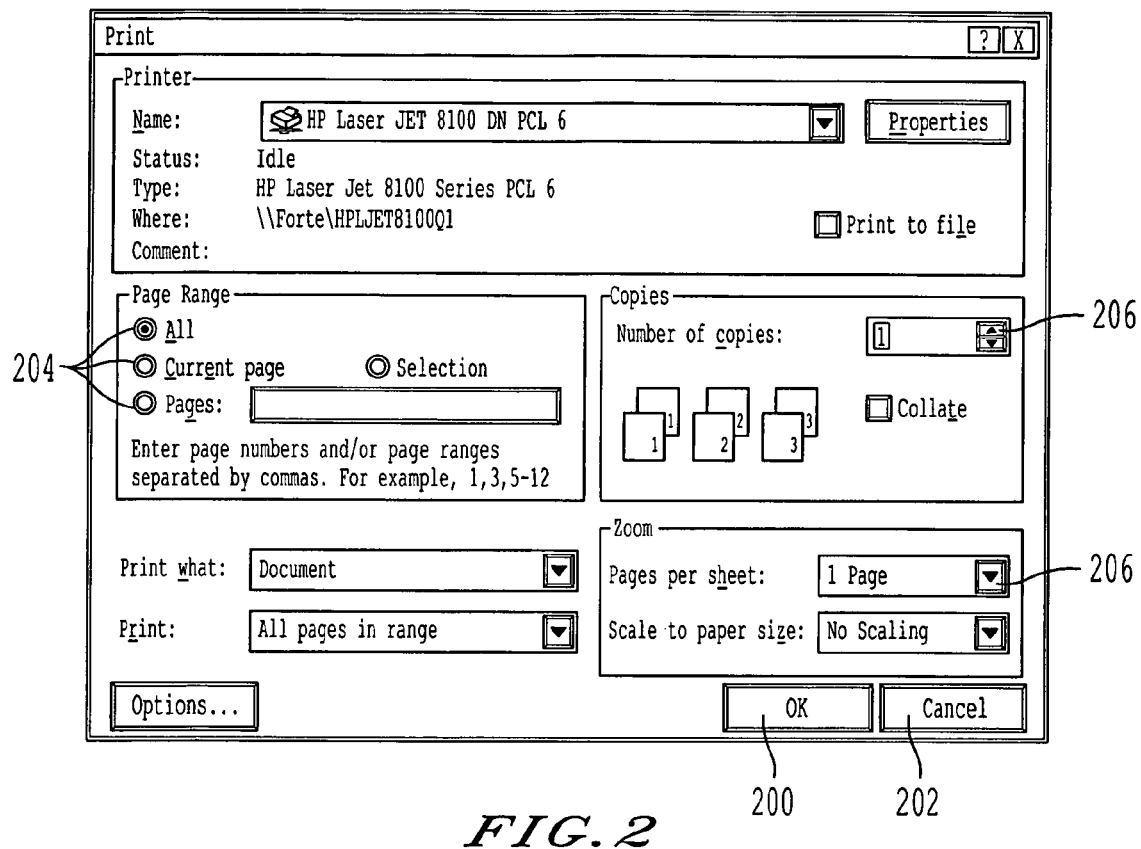
FIG. 2 is a depiction of an exemplary print dialogue box which allows the user to select the printer and change the printer settings.
Figure 3B:
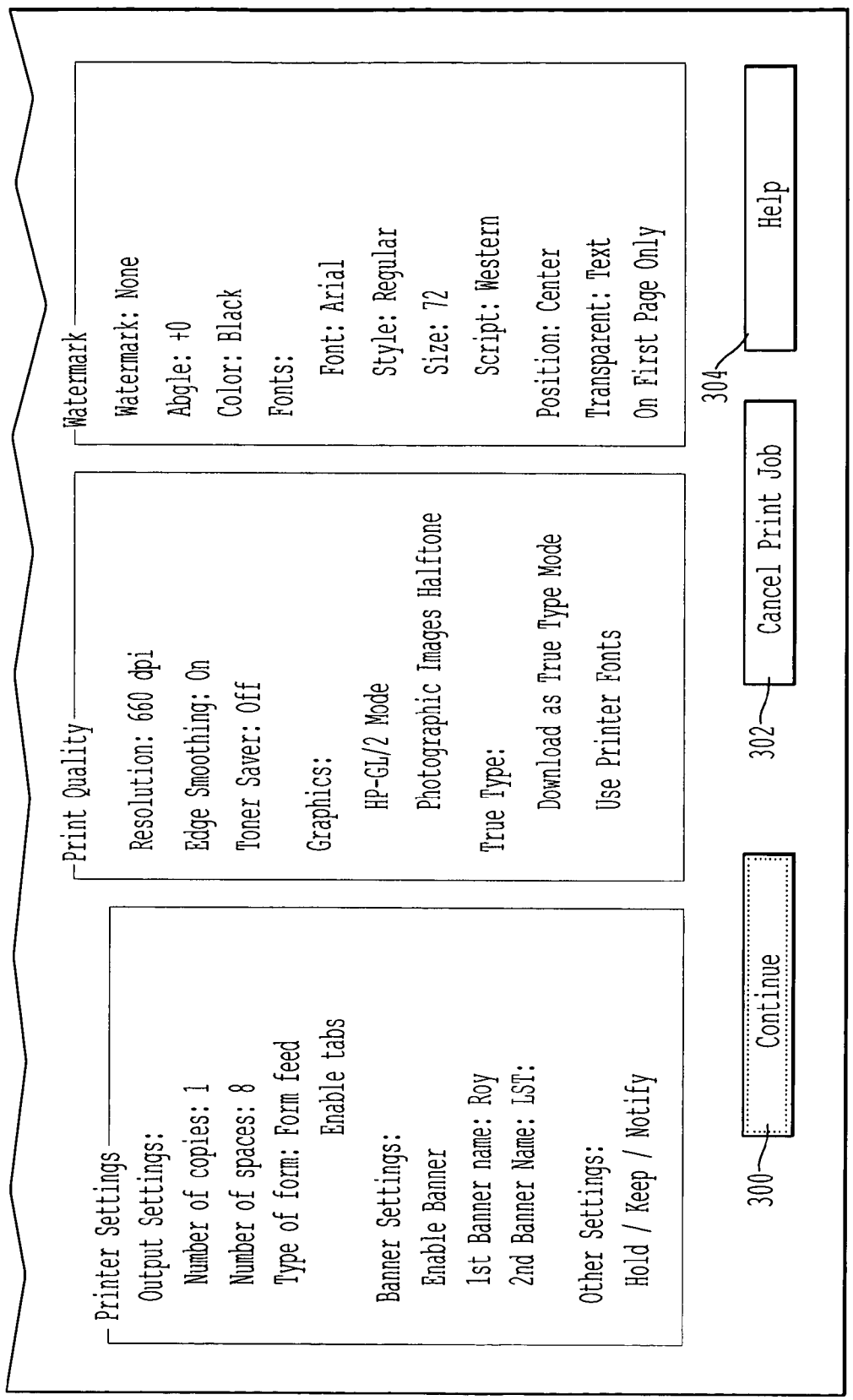
FIG. 3 (taken together as FIGS. 3A and 3B) is a depiction of an exemplary print information dialogue box which allows the user to select the printer and change print settings.

In step 100, the user submits a print job, preferably by issuance of a print command from applications such as a WordPerfect or Word-for-Windows application. At step 102, a print dialogue box such as the exemplary print dialogue box shown in FIG. 2 is displayed to the user. In step 104, the user has the option of continuing with the print job by selecting an "ok" button 200 in the print dialogue box or exiting the print job by selecting the "cancel" button 202, also in the print dialogue box. Selection in step 106 of the "cancel" button 202 terminates the print job and exits back to the original application. Continuation of the print job upon selecting or clicking on the "ok" button 200 automatically displays in step 108 a printing information dialogue box such as the exemplary printing information dialogue box shown in FIG. 3. At this point, the user can review the displayed printing information. At step 110, the user checks to see that the print settings are correct for the impending print job.

If the print settings are correct, the user selects the "Continue" button 300 in the printing information dialogue box and flow proceeds to step 114 and the print job is issued to the printer using the current print settings.

On the other hand, if certain print settings are incorrect, flow proceeds to step 112 in which the user can select to either modify the print settings by selecting the "Modify" button 304 which loops to step 102, thus displaying the print dialog box and allowing the user to change the print settings. By selecting the print settings to be corrected, the user can then modify the print settings by appropriate selection of, for example, radio buttons 204 and predetermined selection boxes 206 within the print dialogue box as shown in FIG. 2. Once the print settings have been modified at step 102, the user resubmits the print job by selecting the "ok" button 202 in the print dialogue box which automatically redisplays the synopsis of the print settings to the user as shown in step 108 providing the user with an opportunity to view the print settings including the modified settings just entered. The process of FIG. 1 continues as described above.

Alternatively, at step 112, the user can elect not to modify the print settings but rather cancel the print job (step 116) by selecting in the printing information dialogue box the "Cancel Print Job" button 302.

Figure 4:
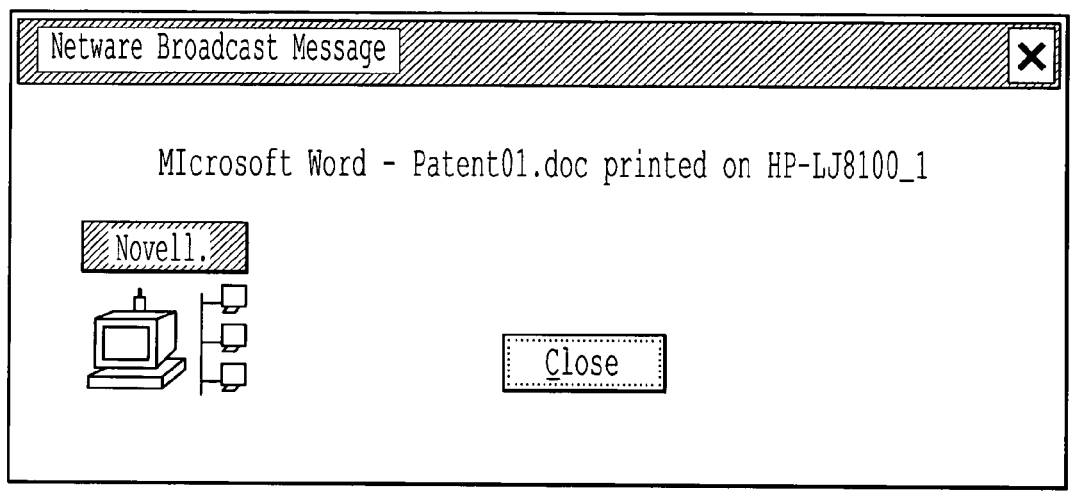

Once the proper print settings are in order as in step 114, the print job is sent to the printer. Once printed, a broadcast message such as the exemplary NetWare broadcast message shown in FIG. 4 is displayed and indicates that the document has been printed on the designated printer.

Figure 5:
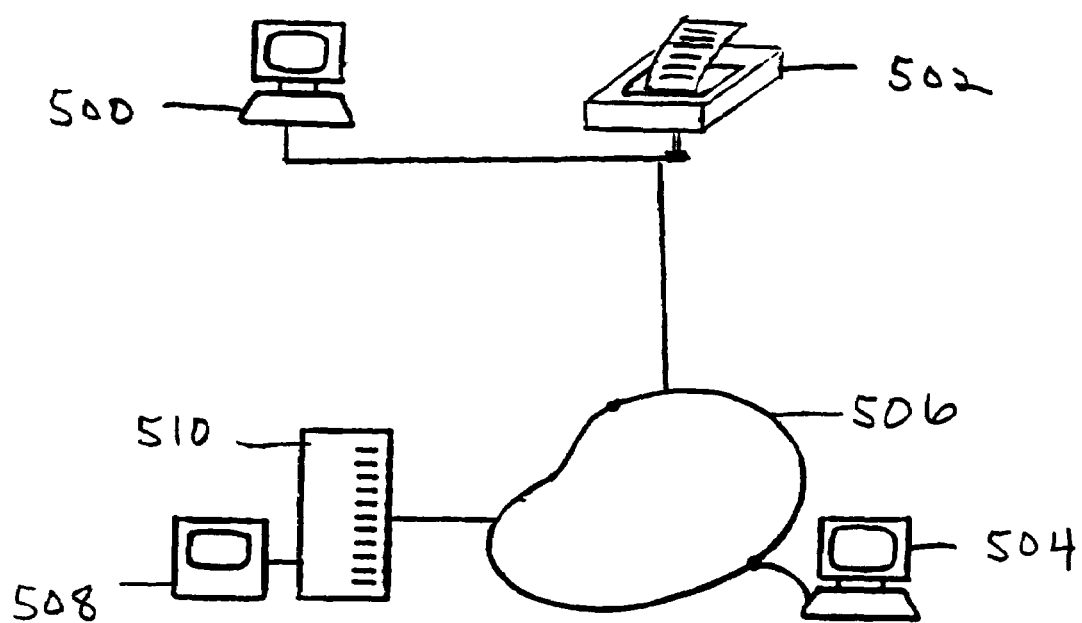
FIG. 5 is a diagram showing implementation of the present invention on a general purpose computer/printer/network.

FIG. 5 shows implementation of the present invention on a general purpose computer/printer/network. As can be seen from FIG. 5, the present invention can be utilized on a local computer 500 directly interfaced to a printer 502. Alternatively, the printer 502 could be interfaced with a network 506. The printer represented by the printer 502 could be a plurality of printers on the network 506. On the network 506, a network computer 504 is connected via the network to a server 508 and data storage device 510. The printing information dialogue box can contain information about the network and about which of the plurality of printers the print job will be routed. Software for implementing the present invention can reside anywhere on the network.

Further, a print control system of the present invention automatically displays in the printing information dialog box a synopsis of the print settings prior to issuance of a print job to the printer. The printing information dialog box is configured to display the print settings for an impending print job, to issue the print job to the printer, to cancel the print job, and to enable modification of the print job prior to issuance to the printer.

The print control system of the present invention includes the print dialog box which allows the user to select a number of print setting options such as a printer, a number of copies to be printed, collation of the copies, a document to be printed, a range of pages within the document to be printed, a number of document pages per printed page, and a page scale size.

The printing information dialog box displays print settings such as, for example, printer name, printer ports, timeout settings, color management, output printer settings, banner settings, paper selection, document size, print size, paper type, printer tray, print resolution, edge smoothing, toner saving, graphics configuration, accessories, statistics, and watermark properties.

In general, it can be seen that a print control system of the present invention comprises a device for requesting a print job, a device for displaying in response to the print request the print settings, a device for modifying the print settings, a device for confirming the print job, a device for displaying, upon receipt of a print job confirmation and prior to issuance of the print job, the print settings for the print job, and a devices for directing the print job including a device for issuing the print job, a device for canceling the print job, and a device for changing the print settings.

The aforesaid methods and devices for automatically displaying the print settings information prior to issuance of the print job are contained according to this invention on a computer program product. The computer program product is a storage medium including instructions which can be used to program a computer or a plurality of networked computers to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

This invention may be conveniently implemented using a general purpose digital computer or a network of general purpose digital computers and/or microprocessors programmed according to the teachings of the present specification, as will be apparent to those skilled in the computer art from reading the above descriptions regarding the figures. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

Figure 6:
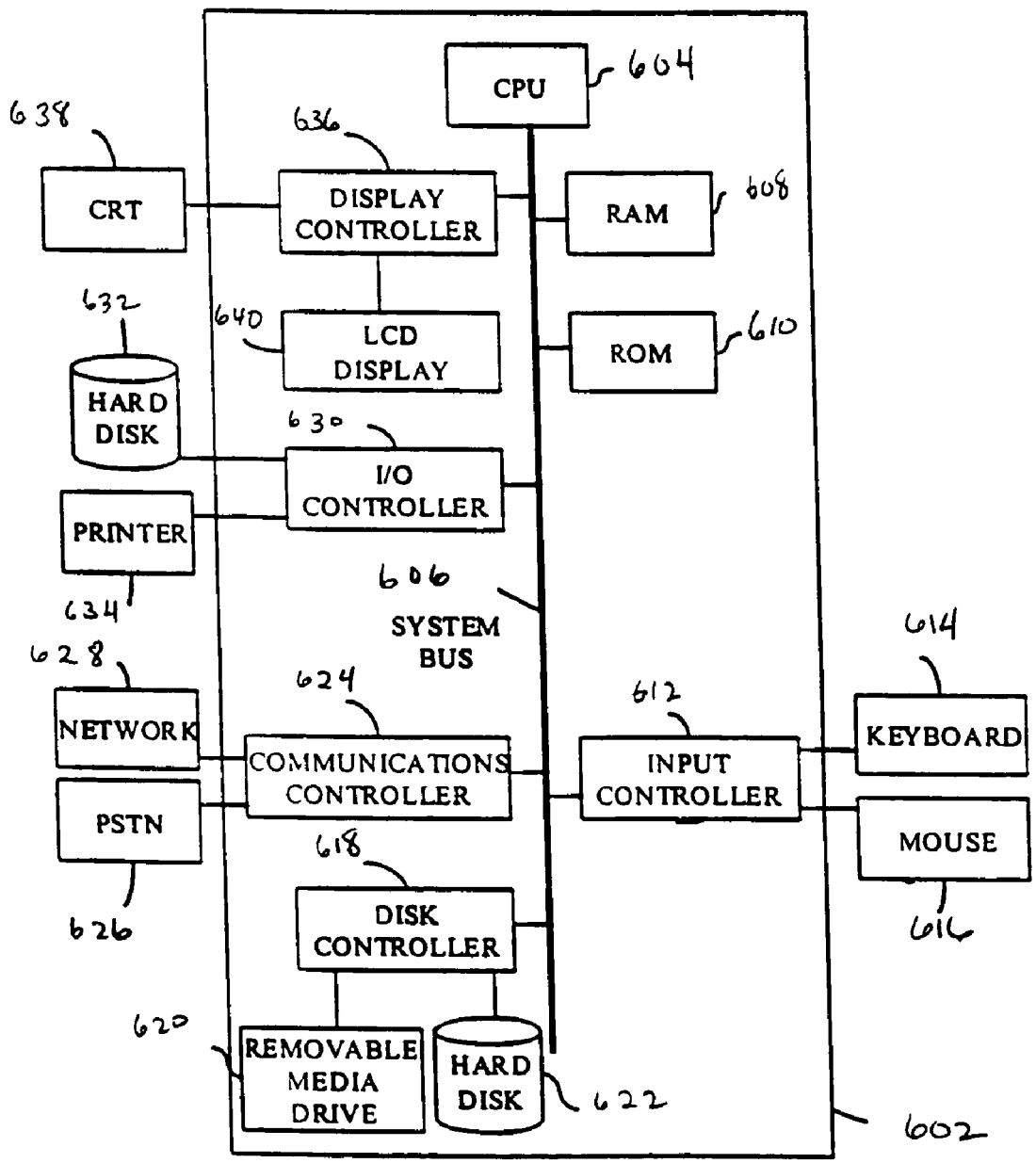
FIG. 6 is a block diagram showing the various components of a computer according to the present invention.

FIG. 6 is a block diagram showing the various components of a computer according to the present invention. The computer 602 can be a personal computer, a portable computer, a computer workstation with sufficient memory and processing capability, or any device configured to work like a computer. In one embodiment, the computer 602 is a device as diagrammatically shown in FIG. 6. In this embodiment, the computer 602 includes a central processing unit 604 (CPU) that communicates with a number of other devices by way of a system bus 606. The computer 602 includes a random access memory (RAM) 608 that stores temporary values used in implementing the print job.

The central processing unit 604 is configured for high volume data transmission and performing a significant number of mathematical calculations in processing the print jobs. A Pentium III microprocessor such as the 1 GHz Pentium III manufactured by Intel Inc. may be used for CPU 604. This processor employs a 32 bit architecture. Other suitable processors include the Motorola 500 MHZ PowerPC G4 processor and the Advanced Micro Devices 1 GHz AMD Athlon processor. Multiple processors or workstations may be used as well.

The ROM 610 is preferably included in a semiconductor form although other read-only memory forms including optical media may be used to host application software and temporary results. The ROM 610 connects to the system bus 606 for use by the CPU 604. The ROM 610 includes computer readable instructions that, when executed by the CPU 604, perform different functions associated with printing and managing print jobs. An input controller 612 connects to the system bus 606 and provides an interface with various peripheral equipment including a keyboard 614 and a pointing device such as a mouse 616, so as to permit user interaction with graphical user interfaces. The input controller 612 may include different ports such as a mouse port in the form of a PS2 port or, for example, a universal serial bus (USB) port. The keyboard port for the input controller 612 is in the form of a mini-DIN port although other connectors may be used as well. The input controller 160 also may include serial ports or parallel ports as well.

A disk controller 618 is in the form of an IDE controller and connects via ribbon cables to a removable media drive 620 which may be implemented as a floppy disk drive, as well as a hard disk drive 622 and a CD-ROM drive (not shown). In addition, a PCI expansion slot is provided on the disk controller 618 or mother board that hosts the CPU 604. An enhanced graphic port expansion slot is provided and provides 3-D graphics with fast access to the main memory. The hard disk 622 may also include a CD drive that may be readable as well as writeable. A communication controller 624 provides a connection to a network L1. The network L1 may be a connection to the public switch telephone network (PSTN) 626 for providing Internet access, or to a network 628 such as a local area network, wide area networks, a virtual private network (VPN), or an extranet. In one embodiment, the network L1 and the connection to the communication controller 624 are made by way of a plurality of connections including a cable-modem connection, Digital Subscriber Line (DSL) connection, fiber optic connection, dial-up modem connection, and the like that connect to the communication controller 624.

An input/output controller 630 also provides connections to external components such as an external hard disk 632, a printer 634, for example, by way of an RS 232 port and a SCSI bus. As noted above, the present invention is not limited to network connections, but can be implemented with a simple printer cable connection between a printer 502 and computer 500 (as shown in FIG. 5).

A display controller 636 interconnects the system bus 606 to a display device, such as a cathode ray tube (CRT) 638. While a CRT is shown, a variety of other display devices may be used such as an LCD (liquid crystal display) 640, or plasma display device. The display device permits displaying of graphical user interfaces.

Numerous modifications and variations of the present invention are possible in light of the above teachings. It is therefore to be understood that within the scope of the appended claims, the invention may be practiced otherwise than as specifically described herein.

What is claimed as new and desired to be secured by Letters Patents of the United States is:

1. A method for processing a print job, comprising the steps of:
   entering, by a user, a print request for starting the print job from an application window;
   displaying, in a one step response to the print request by the user starting the print job, a print dialogue box including print setting modification controls permitting change of the print settings from within the print dialogue box and including a print confirmation control;
   confirming, by the user, by activation of the print confirmation control for a print setting confirmation of the print settings for the print job to be printed;
   displaying, upon the activation of the print confirmation control and prior to processing of the print job for printing, a printing information dialogue box different from the application window and having a synopsis of the print settings for the print job including at least an indication of a paper selection; and
   directing, by a user selection in the printing information dialogue box, the processing of the print job.

2. The method of claim 1, wherein the step of displaying a print dialogue box comprises the step of:
   displaying a print dialogue box configured to display print settings for the print job.

3. The method of claim 1, the step of directing the processing of the print job comprises the step of:
   issuing the print job from the printing information dialogue box.

4. The method of claim 3, wherein the step of issuing the print job from the printing information dialogue box comprises the step of:
   selecting in the printing information dialogue box a print selection device.

5. The method of claim 1, wherein the step of directing the processing of the print job comprises the step of:
   canceling the print job from the printing information dialogue box.

6. The method of claim 5, wherein the step of canceling the print job from the printing information dialogue box comprises the step of:
   selecting in the printing information dialogue box a cancel selection device.

7. The method of claim 1, wherein the step of directing the processing of the print job comprises the step of:
   resubmitting the print job from the printing information dialogue box.

8. The method of claim 7, wherein the step of resubmitting the print job from the printing information dialogue box comprises the step of:
   selecting in the printing information dialogue box a modify selection device.

9. The printing method of claim 8, wherein the step of resubmitting the print job from the printing information dialogue box further comprises the steps of:
   redisplaying said print dialogue box;
   modifying the print settings from said print dialogue box;
   reconfirming the print job from said print dialogue box;
   redisplaying, upon receipt of the reconfirmation and prior to issuing the print job, said printing information dialogue box; and
   redirecting, by said user selection, the processing of the print job.

10. The method of claim 9, wherein the step of redirecting the processing of the print job comprises the step of:
    issuing the print job from the printing information dialogue box.

11. The method of claim 10, wherein the step of issuing the print job from the printing information dialogue box comprises the step of:
    selecting in the printing information dialogue box a print selection device.

12. The method of claim 9, wherein the step of redirecting the processing of the print job comprises the step of:
    canceling the print job from the printing information dialogue box.

13. The method of claim 12, wherein the step of canceling the print job from the printing information dialogue box comprises the step of:
    selecting in the printing information dialogue box a cancel selection device.

14. The method of claim 9, wherein the step of redirecting the processing of the print job comprises the step of:
    resubmitting again the print job from the printing information dialogue box.

15. The method of claim 14, wherein the step of resubmitting the print job from the printing information dialogue box comprises the step of:
    selecting again in the printing information dialogue box the modify selection device.

16. The printing method of claim 1, further comprising the step of:
    displaying a print job dialogue box indicating that the print job is complete.

* * * * *